(12) United States Patent
Albakhit et al.

(10) Patent No.: US 11,098,965 B2
(45) Date of Patent: Aug. 24, 2021

(54) RADIATOR AND LATERAL BUMP STOP THEREFOR

(71) Applicant: Caterpillar Inc., Deerfield, IL (US)

(72) Inventors: Hussien A Albakhit, Peoria, IL (US); Virender Kumar, Dunlap, IL (US); Jeffrey Joseph Speichinger, Peoria, IL (US); James McCoy Voelker, Metamora, IL (US); Fei Wang, Peoria, IL (US); Sudhakar Lakshminarayanan, Dunlap, IL (US); Dongming Tan, Dunlap, IL (US); Neil Alan Terry, Edelstein, IL (US)

(73) Assignee: Caterpillar Inc., Peoria, IL (US)

( * ) Notice: Subject to any disclaimer, the term of this patent is extended or adjusted under 35 U.S.C. 154(b) by 196 days.

(21) Appl. No.: 16/378,645

(22) Filed: Apr. 9, 2019

(65) Prior Publication Data
US 2020/0326143 A1  Oct. 15, 2020

(51) Int. Cl.
*F28F 9/013* (2006.01)
*F16F 1/376* (2006.01)
*F28D 7/16* (2006.01)

(52) U.S. Cl.
CPC ............ *F28F 9/0132* (2013.01); *F16F 1/376* (2013.01); *F28D 7/16* (2013.01); *F28F 2265/30* (2013.01)

(58) Field of Classification Search
CPC .......... F28F 9/0132; F28F 9/002; F28F 9/013; F28F 2265/30; F16F 1/376; F28D 7/16; B60K 11/04
USPC ................... 165/67, 69, 149, 162; 180/68.4; 248/316.1, 316.7, 560, 615, 634
See application file for complete search history.

(56) References Cited

U.S. PATENT DOCUMENTS

| | | | |
|---|---|---|---|
| 1,772,806 A | 8/1930 | Grace | |
| 2,862,693 A | 12/1958 | Tinker | |
| 4,216,824 A | 8/1980 | Braun | |
| 4,245,694 A | 1/1981 | Smith | |
| 5,186,244 A | 2/1993 | Joshi | |
| 5,544,714 A | 8/1996 | May et al. | |
| 5,613,551 A * | 3/1997 | Rhodes | F28F 9/001 165/149 |
| 6,098,702 A * | 8/2000 | Shadbourne | B60K 11/04 165/67 |
| 6,883,762 B2 | 4/2005 | Miura et al. | |

(Continued)

FOREIGN PATENT DOCUMENTS

| | | | |
|---|---|---|---|
| JP | 2006234194 | * | 9/2006 |
| WO | 2018053584 W | | 3/2018 |

OTHER PUBLICATIONS

Hideyuki JP 2006 234194 Translation 2006 (Year: 2006).*
Morley WO 2018/053584 A1 2018 (Year: 2018).*

*Primary Examiner* — Elizabeth J Martin
(74) *Attorney, Agent, or Firm* — Hibshman Claim Construction PLLC

(57) ABSTRACT

A radiator includes a radiator frame, an array of tube assemblies each including a coolant tube and a tube clip supported in the radiator frame, and a lateral bump stop fitted between the array of tube assemblies and the radiator frame. The lateral bump stop includes cushions arranged in a staggered cushion pattern complementary to a staggered packing pattern of the tube assemblies with each of the cushions in contact with the tube clip of one of the tube assemblies.

18 Claims, 5 Drawing Sheets

(56) References Cited

U.S. PATENT DOCUMENTS

| | | | |
|---|---|---|---|
| 7,520,318 B2* | 4/2009 | Kwon | F28D 1/0443 165/140 |
| 8,561,741 B2 | 10/2013 | Kurokawa et al. | |
| 9,400,143 B2 | 7/2016 | Grande Fernandez et al. | |
| 2004/0089769 A1* | 5/2004 | Carrier | B60K 11/04 248/71 |
| 2016/0231066 A1 | 8/2016 | Gopireddy et al. | |

* cited by examiner

US 11,098,965 B2

RADIATOR AND LATERAL BUMP STOP THEREFOR

TECHNICAL FIELD

The present disclosure relates generally to machine cooling systems, and more particularly to a lateral bump stop in a radiator for mitigating shocks, vibrations and other loads.

BACKGROUND

Temperature control systems are indispensable parts of modern machinery. Internal combustion engines and other on-board equipment generate heat during operation which must be managed to avoid exceeding the temperature capabilities of the equipment. In a typical application, such as that of a mobile machine, engine coolant is circulated through an engine housing to exchange heat with the engine housing, and then to an air-cooled radiator where a flow of air is passed over heat exchange components to reduce a temperature of coolant conveyed therein. A wide variety of different constructions of radiators are well known and widely used.

In one radiator design commonly used for harsh machine applications, such as in off-highway vehicles, the radiator is constructed with a plurality of heat exchange tubes that are supported by way of non-metallic "grommets" within a radiator frame. Decades of field experience has validated the rugged and reliable nature of so-called copper grommeted tube or "CGT" radiators. Off-highway machines are typically used in highly demanding conditions, subjecting the machine and its on-board equipment to bumps, vibrations, and other mechanical disturbances that can cause less robust radiators to experience performance degradation or failure. CGT radiators of conventional design are not without shortcomings, however. One known radiator design is set forth in United States Patent Application Publication No. 2016/0231066 to Gopireddy et al. The Gopireddy concept proposes a support for tube and fin assemblies in a radiator where a single support securable to multiple tube and fin assemblies in a single row is interlockable with respect to similar supports interconnected with rows of tube and fin assemblies in front of and/or behind that row.

SUMMARY OF THE INVENTION

In one aspect, a radiator includes a radiator frame having a first frame side, a second frame side, a first frame end, and a second frame end. The radiator further includes an array of tube assemblies each including a coolant tube and a tube clip coupled with the coolant tube at a mid-support location. The array of tube assemblies are supported in the radiator frame in parallel vertical orientations between the first frame end and the second frame end and include inner tube assemblies, and peripheral tube assemblies arranged in a staggered packing pattern adjacent to the first frame side. The radiator further includes a lateral bump stop fitted between the array of tube assemblies and the first frame side, the lateral bump stop including a plurality of cushions arranged in a staggered cushion pattern complementary to the staggered packing pattern and each in contact with the tube clip of one of the peripheral tube assemblies.

In another aspect, a lateral bump stop for supporting an array of tube assemblies in a radiator includes an elongate body having a back side with a planar back face, and a front side formed by a plurality of cushions distributed along a length of the elongate body from a first body end to a second body end. The plurality of cushions are arranged in a staggered cushion pattern, and each include a front cushion face oriented parallel to the planar back face, and a horizontal support face oriented normal to the front cushion face. The front cushion faces are stepped off from one another by a plurality of different step distances that are based on the staggered cushion pattern, such that the front side of the elongate body forms a variable-step profile structured to complement a staggered packing pattern of the array of tube assemblies in the radiator.

In still another aspect, a shock and vibration mitigation system for a radiator includes a lateral bump stop having an elongate body with a back side having a planar back face, and a front side formed by a plurality of cushions. The plurality of cushions are arranged in a staggered cushion pattern, and each includes a front cushion face oriented parallel to the planar back face. The front cushion faces are stepped off from one another according to the staggered cushion pattern, such that the front side of the elongate body forms a stepped profile. The system further includes a plurality of tube clips, for mid-support of coolant tubes in the radiator, each being in contact with one of the plurality of cushions, and the plurality of tube clips are interlocked with one another and arranged in a staggered packing pattern that is complementary to the staggered cushion pattern.

DETAILED DESCRIPTION

Figure 1:
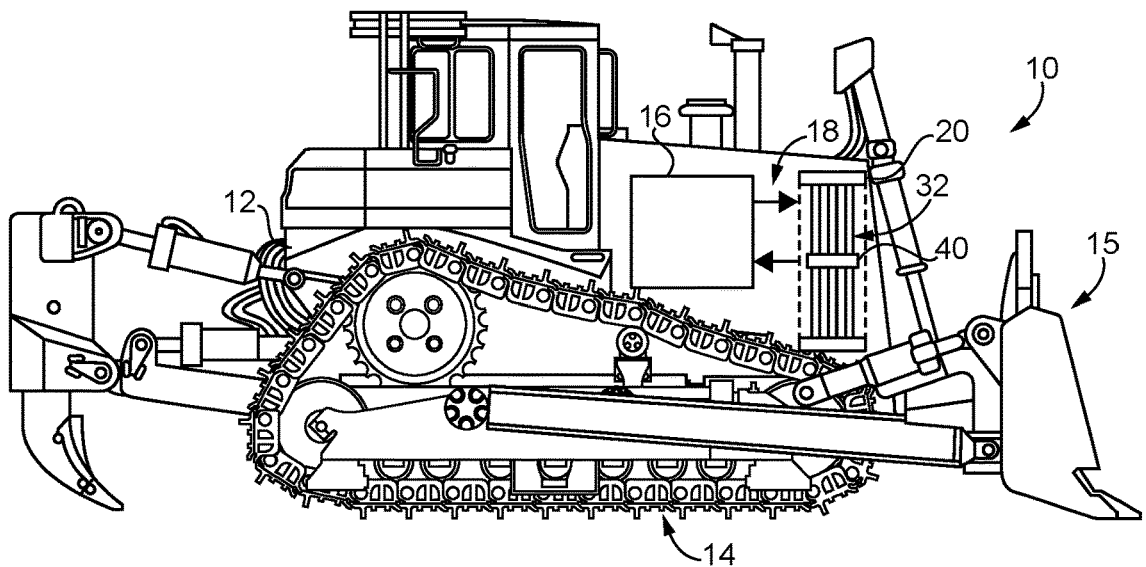
FIG. 1 is a side diagrammatic view of a machine, according to one embodiment.

Referring to FIG. 1, there is shown a machine 10 according to one embodiment, and including a frame 12 and ground-engaging elements 14 coupled to frame 12 for propelling machine 10. Ground-engaging elements 14 are shown as a ground-engaging track, however, it should be appreciated that ground-engaging elements 14 might be wheels in other embodiments. Machine 10 further includes an implement system 15 including, for example, a dozing blade, mounted to frame 12. An internal combustion engine 16, such as a compression ignition diesel engine, provides power for operating ground-engaging elements 14 and a variety of other subsystems of machine 10. A cooling system 18 is also provided and associated with internal combustion engine 16, and potentially other subsystems of machine 10 such as a transmission, a hydraulic system, or still others, and includes a radiator 20 mounted near a front end of frame 12 such that air for cooling a temperature control fluid circulated between internal combustion engine 16 and radiator 20 can be passed through radiator 20 in a generally conventional manner. Machine 10 is shown in the context of a track-type tractor, however, other off-highway machines such as trucks, backhoes, excavators, scrapers, or still others, and particularly those operated in demanding service conditions are contemplated herein. As will be further apparent from the following description, cooling system 18 is uniquely configured by way of parts of radiator 20 for mitigating shocks, vibrations, or other forms of loading experienced by or produced by machine 10 during service.

Figure 2:
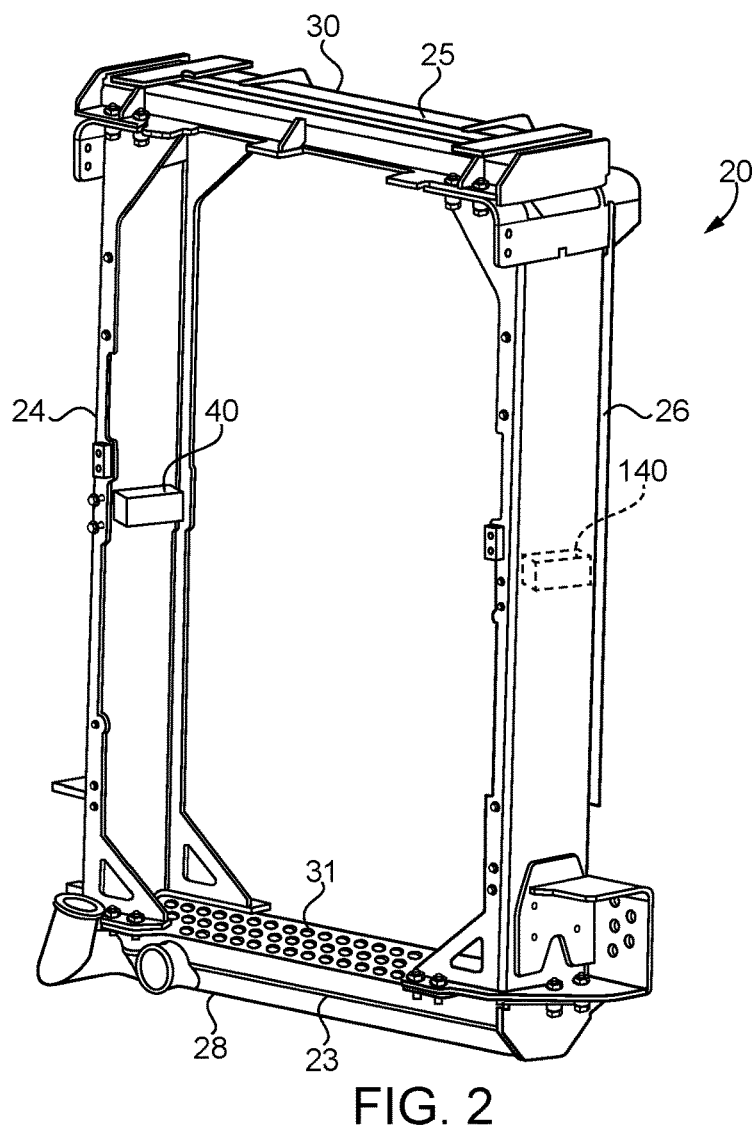
FIG. 2 is a perspective view of a radiator frame assembly, according to one embodiment.

Referring also to FIG. 2, radiator 20 includes a radiator frame 22 having a first frame side 24, a second frame side 26, a first frame end 28, and a second frame end 30. Each of first frame side 24 and second frame side 26 can include a side panel or side channel formed of metallic plate or sheet material, and extending between first frame end 28 and second frame end 30. First frame end 28 can include a tank 23, and second frame end 30 can include another tank 25. Each of tank 23 and tank 25 can include or alternatively be a manifold distributing coolant to coolant tubes in radiator 20 or receiving coolant from coolant tubes in radiator 20. A plurality of holes 31 are formed in first frame end 28, for receiving a plurality of tube assemblies further discussed herein and illustrated diagrammatically at 32 in FIG. 1. Holes can analogously be formed in second frame end 30. In one implementation, radiator 20 can include a grommeted tube radiator, such as a copper grommeted tube or CGT radiator, where coolant tubes are each individually fitted into holes in a manifold or the like by way of a non-metallic sealing end support element generally referred to as a grommet. CGT radiators are known to be applicable to harsh environments, such as those within which off-highway machinery is often operated. Radiator 20 includes a first lateral bump stop 40 supported adjacent to first frame side 24, and a second lateral bump stop 40 supported adjacent to second frame side 26.

Figure 3:
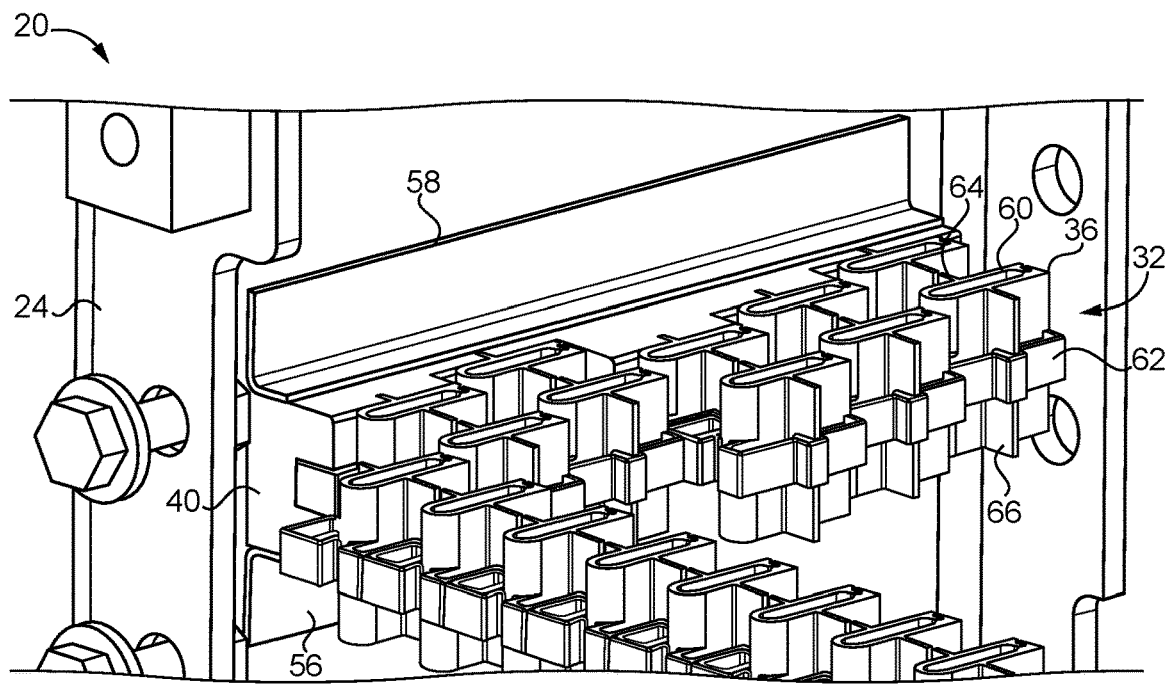
FIG. 3 is a diagrammatic view of portions of a radiator, according to one embodiment.
Figure 4:
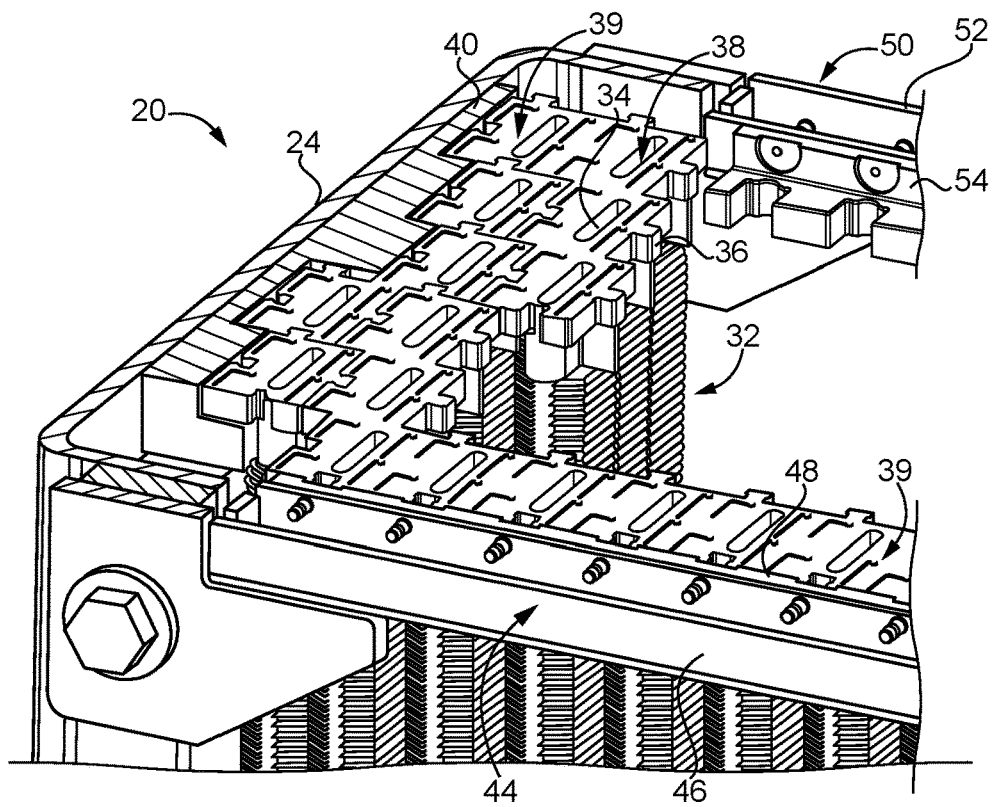
FIG. 4 is a sectioned view through a portion of a radiator, according to one embodiment.

Referring also now to FIG. 3 and FIG. 4, there are shown views of portions of radiator 20 illustrating additional details. Radiator 20 includes an array of tube assemblies 32 each including a coolant tube 34 and a tube clip 36 coupled with the corresponding coolant tube 34 at a mid-support location. The term "mid-support location" means a supporting location that is between first frame end 28 and second frame end 30, and typically about halfway between first frame end 28 and second frame end 30 and nearer to a longitudinal middle location of each coolant tube 34 than to locations of its opposite ends. The array of tube assemblies 32 is supported in radiator frame 22 in parallel vertical orientations between first frame end 28 and second frame end 30. In one implementation the array of tube assemblies 32 will be supported parallel to one another and vertically oriented in machine 12. In other implementations, radiator 20 could be potentially turned on its side such that tube assemblies 32 are oriented horizontally in machine 12. The described vertical orientations of tube assemblies 32 are to be understood in reference to radiator frame 22, thus no particular limitation outside of the relevant reference frame is intended herein by way of the terms vertical, horizontal, or like directional indicators.

The array of tube assemblies 32 further includes inner tube assemblies 38, and peripheral tube assemblies 39. Inner tube assemblies 38 can be understood as those tube assemblies that are surrounded on all sides by other tube assemblies, whereas peripheral tube assemblies 39 are understood as tube assemblies that are surrounded by other tube assemblies on less than all sides and thus form a part of a periphery of the array of tube assemblies 32. The array of tube assemblies 32 can be arranged according to a packing arrangement in radiator 20, which will typically mean that tube assemblies 32 are positioned relative to one another in a manner that optimizes filling of space within radiator 20, while still providing some space between and among coolant tubes 34 for the passage of cooling air. Each coolant tube 34 can typically be an elongated copper coolant tube, and in the illustrated case having an elongated shape in axial cross-section such as might be obtained by flattening a cylindrical tube along its length. Each of tube clips 36 can be formed from a non-metallic material, such as a polymeric material, and includes a hollow center body 60 that is slipped over a corresponding one of coolant tubes 34. Each tube clip 36 can further include a skirt block 62 that is positioned approximately mid-way between opposite ends of hollow center body 60, and a plurality of outwardly projecting tabs. A first tab 64 may be vertically oriented and extends from hollow center body 60 on a first side, whereas another tab 66 is generally vertically oriented and extends from hollow center body 60 on an opposite side. Tab 64 could include an upper tab portion and a lower tab portion as shown, as could tab 66. Tube clips 36 are generally of a known design structured for mid-support of coolant tubes 34, and contacting one another by way, at least, of each skirt block 62 to enable loads to be transmitted among tube assemblies 32, while positioning and supporting the array of tube assemblies 32 in the desired packing pattern.

As shown in FIG. 4, radiator 20 further includes a forward stop bar 44 extending horizontally across a forward side of the array of tube assemblies 32, and a back stop bar 50 extending horizontally across a back side of the array of tube assemblies 32. Forward stop bar 44 can include a beam 46, such as a metallic plate beam, that is bolted to first frame side 24 and second frame side 26, and a bumper 48 positioned between beam 46 and peripheral tube assemblies 39. Back stop bar 50 may likewise be bolted or otherwise attached to first frame side 24 and second frame side 26, and includes a bumper 54 positioned between beam 52 and peripheral tube assemblies, not shown in FIG. 4. It will be appreciated that forward stop bar 44 and back stop bar 50 can together assist in mid-support of the array of tube assemblies 32, limiting deflection, deformation, shocks or vibrations experienced by tube assemblies 32 in a generally known manner. Mitigation of shocks, vibrations, and other forms of loading of the array of tube assemblies 32 that are lateral to the array of tube assemblies 32 can also be achieved according to the present disclosure.

It will be recalled that radiator 20 can include a first lateral bump stop 40, and a second lateral bump stop 140. The following description of lateral bump stop 40 can be understood by way of analogy to refer to lateral bump stop 140 and other contemplated embodiments, except where otherwise indicated or apparent from the context. Peripheral tube assemblies 39, on a side of the array of tube assemblies 32 extending generally orthogonal to forward stop bar 44 and back stop bar 50, include peripheral tube assemblies 39 arranged in a staggered packing pattern adjacent to first frame side 24. It should be appreciated that other parts of the array of tube assemblies 32 could be understood to include tube assemblies arranged in a staggered packing pattern. It can be noted from FIG. 4 that peripheral tube assemblies 39 vary in their positioning relative to first frame side 24, in other words some of peripheral tube assemblies 39 are positioned relatively more to the left, some relatively more to the fight, adjacent to lateral bump stop 40. This staggered packing pattern can enable additional tube assemblies 32 for additional cooling efficacy to be positioned within the limited space defined by radiator frame 22 relative to what otherwise might be possible if the array of tube assemblies 32, and in particular peripheral tube assemblies 39, had a differently configured packing pattern such as a square packing pattern or the like. Lateral bump stop 40 is fitted between the array of tube assemblies 32 and first frame side 24 and mitigates lateral loads on the array of tube assemblies 32. As depicted in FIG. 3, lateral bump stop 40 is trapped between an upper mounting plate 58 and a lower mounting plate 56, each supported adjacent to first frame side 24 and potentially bolted or otherwise directly attached to first frame side 24. Lateral bump stop 40 is in contact with the tube clip 36 of each of a plurality of peripheral tube assemblies 39. By way of analogy, it will be appreciated that second lateral bump stop 140 can be fitted between the array of tube assemblies 32 and the second side 26 of radiator frame 22, and in contact with each a plurality of tube clips 36 in the array of tube assemblies 32. A variety of different mounting strategies for first lateral bump stop 40, second lateral bump stop 140, and other lateral bump stops contemplated herein may be used.

Figure 5:
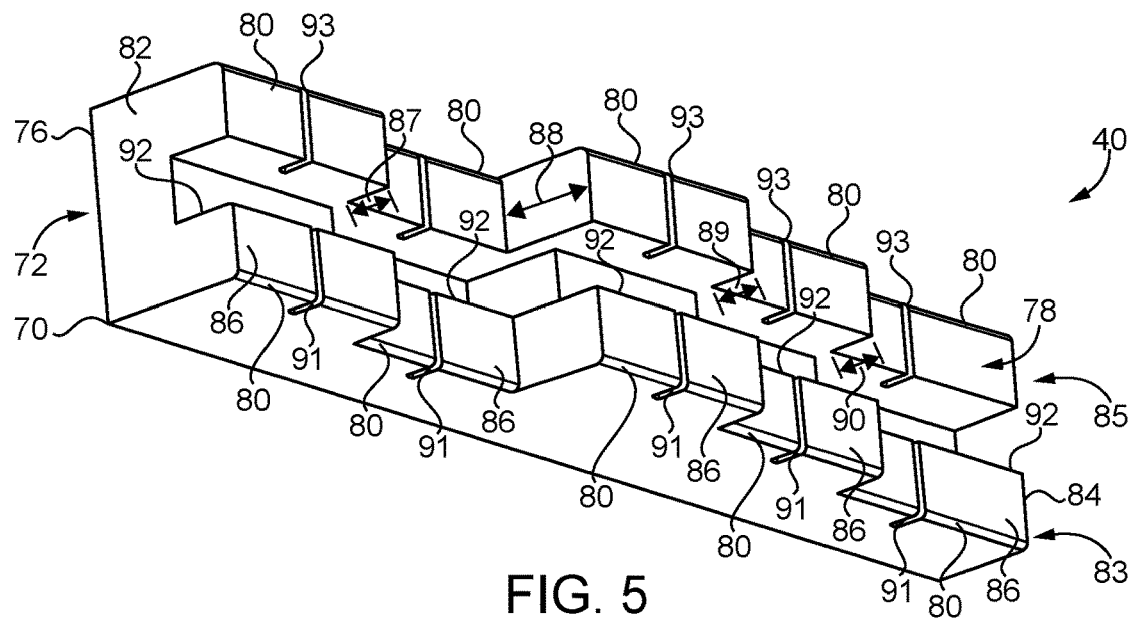
FIG. 5 is an isometric view of a lateral bump stop for a radiator, according to one embodiment.

Referring also now to FIG. 5, there are shown features of lateral bump stop 40 in greater detail. As discussed above, lateral bump stop 40 is fitted between the array of tube assemblies 32 and first frame side 24. Lateral bump stop 40 includes a plurality of cushions 80 arranged in a staggered cushion pattern complementary to the staggered packing pattern of peripheral tube assemblies 39, with cushions 80 each in contact with the tube clip 36 of one of peripheral tube assemblies 39. Lateral bump stop 40 has an elongate body 70, which may be a molded one-piece body formed entirely of a polymeric material such as a tubber material, a rubber-like material, or still another non-metallic material, or perhaps a composite of non-metallic and metallic materials. Elongate body 70 includes a back side 72 having a planar back face 76, and a front side 78 formed by the plurality of cushions 80. Cushions 80 are distributed along a length of elongate body 70 from a first body end 82 to a second body end 84. In the illustrated embodiment, cushions 80 are arranged in a first horizontal row of cushions 83 and a second horizontal row of cushions 85. Cushions 80 are arranged in a staggered cushion pattern as noted above, and each includes a front cushion face 86 oriented parallel to the planar back face 76, and a horizontal support face 92 oriented normal to the front cushion face 86. It can be noted from FIGS. 3 and 4 that each skirt block 62 of each tube clip 36 may be positioned in contact with horizontal support face 92, and that hollow center body 60 may be positioned in contact with cushion face 80. Skirt blocks 62 may be trapped vertically between cushions 80 in first horizontal row 83 and cushions 80 in second horizontal row 85.

Figure 6:
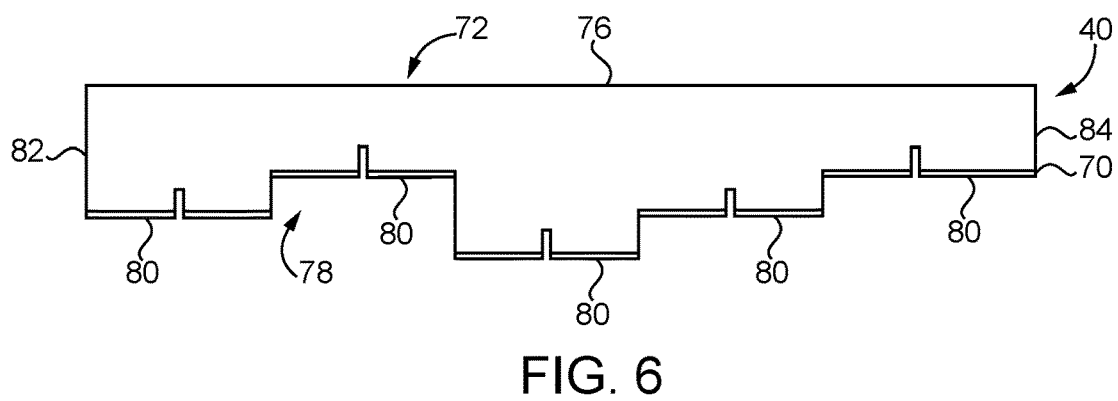
FIG. 6 is a top view of the lateral bump stop of FIG. 5.

Contact between tube clip 36, hereinafter referred to in the singular, with horizontal support face 92, and an opposed horizontal support face (not numbered) of cushions 80 in second horizontal now 85, can transmit generally vertical shocks, deflections, vibrations, et cetera, between tube clip 36 and lateral bump stop 40. Contact with cushion face 80 transmits shocks, deflections, vibrations et cetera, that are laterally directed. Also in the illustrated embodiment a number of cushions 80 in each of row 83 and row 85 is five, however, the present disclosure is not thereby limited and a greater number of cushions such as six, seven, eight or more could be implemented, or a lesser number of cushions such as four or three, for instance. Front cushion faces 86 are stepped off from one another by a plurality of different step distances 87, 88, 89, and 90. In the embodiment shown, step distance 88 is largest, and each of step distances 87, 89, and 90 is approximately equal, however, s the step distances could all be different, or could all be equal. The plurality of different step distances 87, 88, 89, and 90 are based on the staggered cushion pattern, such that front side 78 of elongate body 70 forms a variable-step profile structured to complement the staggered packing pattern of the array of tube assemblies 32 in radiator 20. Referring also to FIG. 6, it can be seen that a lateral thickness of elongate body 70 between planar back face 76 and cushion faces 86 is stepped down, in net, from first body end 82 to second body end 84. This means that, while at any given location a lateral thickness might be more or less, in net, lateral thickness of elongate body 70 is reduced from one body end to the other, in the illustrated case from first body end 82 to second body end 84. Also shown in FIGS. 3-6 are a plurality of slots 91 formed in elongate body 70 and each extending vertically through one of cushions 80, in the illustrated case cushions 80 in first horizontal row 83. Slots 91 can be a first set of slots extending vertically through first horizontal row 83, and further including a second set of slots 93 extending vertically through second horizontal row 85 and in longitudinal alignment with first set of slots 91. Slots 91 and 93 may receive tab 64, potentially two separate tab portions positioned on opposite vertical sides of skirt block 62, when lateral bump stop 40 is positioned for service in radiator 20. Tab 64 can be inserted into a slot 91 or 93 with a slight interference fit, deforming material of lateral bump stop 40. Skirt block 62 may be similarly fitted between cushions 80 of row 83 and row 85.

Figure 7:
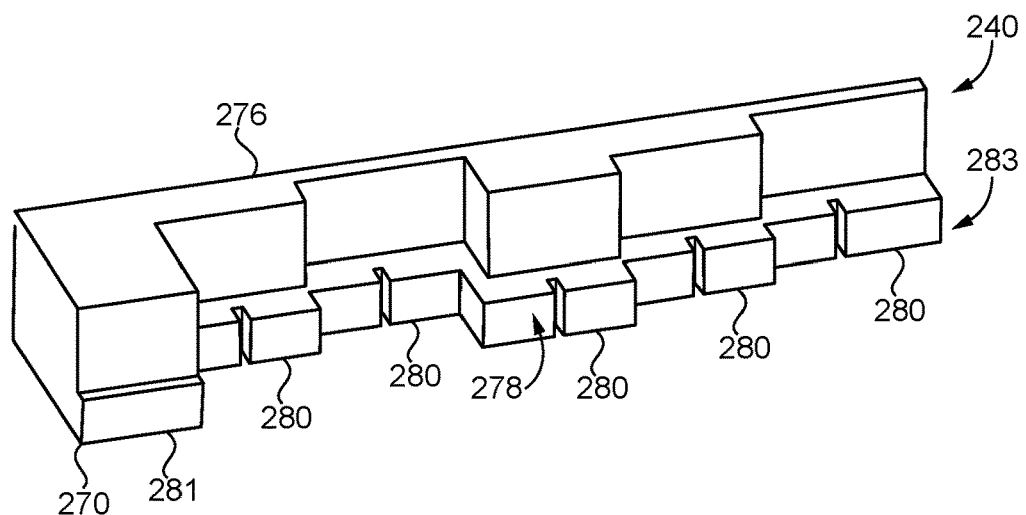
FIG. 7 is a isometric view of a lateral bump stop for a radiator, according to another embodiment.

Referring now to FIG. 7, there is shown a lateral bump stop 240 according to another embodiment, and including a planar back face 276, a front side 278 formed by a plurality of cushions 280 distributed along a length of elongate body 240. Having only a single row 283 of cushions 280, it is contemplated that lateral bump stop 240 could be fitted into a service position in certain confined spaces within a radiator that might not be as easily fitted with other lateral bump stop embodiments. It can also be noted that lateral bump stop 240 includes an end block 281 which may serve as a cushion, but which might additionally or alternatively wrap around a corner of an array of tube assemblies when installed for service.

Figure 8:
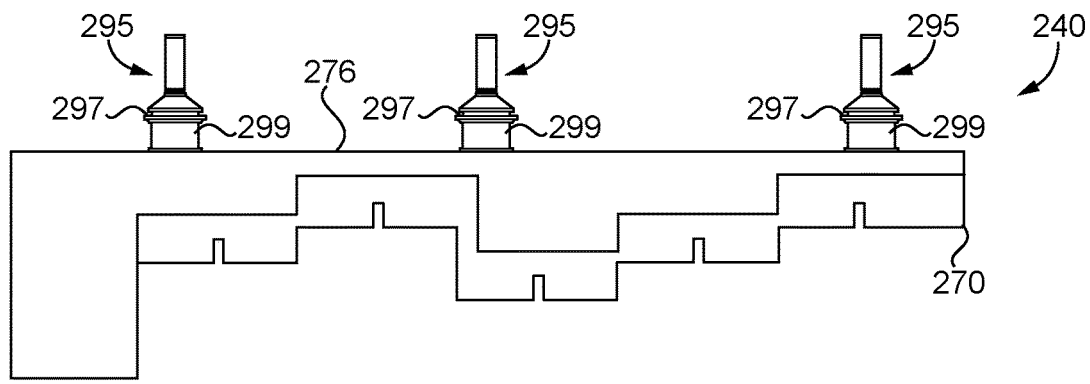
FIG. 8 a top view of the lateral bump stop of FIG. 7.

Referring now to FIG. 8, there is shown a top view of lateral bump stop 240 illustrating additional details. Lateral bump stop 240 includes a plurality of mounting elements 295 arranged within a perimeter of planar back face and projecting from planar back face 276. It is contemplated that lateral bump stop 240 can be installed for service and supported in a service position in a radiator by fitting mounting elements 295 through registering holes formed in the side of the radiator frame. Mounting elements 295 may be formed integrally in elongate one-piece body 270, Thus, mounting elements 295 may be formed from the same monolithic piece of non-metallic molded material as is the rest of lateral bump stop 240. In the illustrated embodiment, each mounting element 295 has a neck 299 and a head 297 that is relatively wider than neck 299, enabling mounting elements 295 to be interference fitted through mounting holes similar in diameter to necks 299, with heads 297 deformed to pass mounting elements 295 through the receiving mounting holes.

Figure 9:
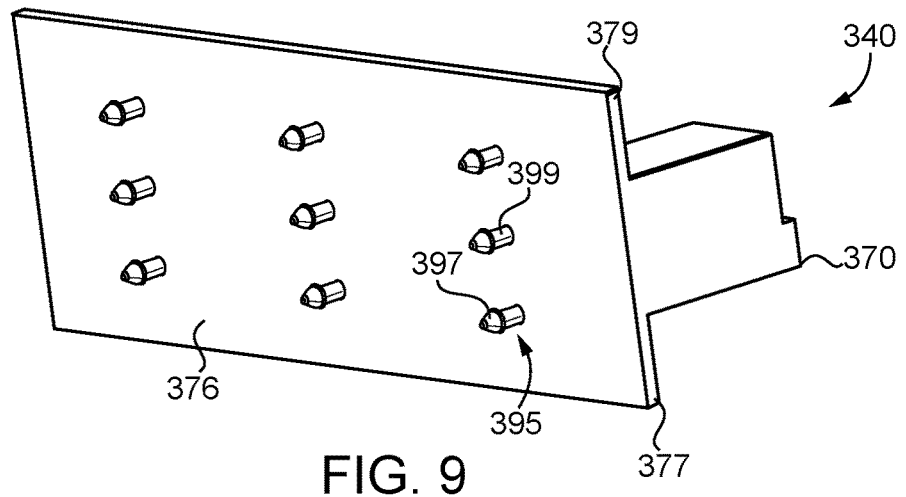
FIG. 9 is an isometric view of a bump stop for a radiator, according to yet another embodiment.

Referring now to FIG. 9, there is shown a lateral bump stop 340 according to another embodiment and including an elongate, one-piece body 370. Elongate one-piece body 370 can be structured similarly or identical to elongate one-piece body 270, elongate one-piece body 70, or other embodiments contemplated herein, except for certain differences. Analogously, it should be appreciated that description herein of features or functionality of any one embodiment are to be understood by way of analogy to refer to features or functionality of any other embodiment except where otherwise indicated or apparent from the context. One-piece elongate body 370 includes a planar back face 376 forming a back side of lateral bump stop 340 and elongate body 370 upon a mounting panel. The mounting panel may be formed by an upwardly projecting flange section 379, a downwardly projecting flange section 377, and a middle section (not numbered) that is continuous with sections 377 and 379. A plurality of mounting elements 395 project outwardly from planar back face 376, and are formed integrally with elongate body 370. Mounting elements 395 may be arranged within a perimeter of planar back face 376 and project from planar back face 376. Each mounting element 395 may further include a relatively narrower neck 399 and a relatively wider head 397, generally analogous to interference fitting within registering mounting holes in a radiator frame the embodiment of FIG. 8. In still other embodiments, a mounting panel could be formed with molded-in, or machined, or punched mounting holes, and separate fasteners could be used for installation. In such an embodiment, the appearance might be fairly similar to FIG. 9, but instead of mounting elements 395 that project from planar back face 376, holes could be formed in elongate body 370 that extend through flange section 379 and flange section 377, for example. It should also be appreciated that all embodiments contemplated herein could be equipped with integral mounting elements such as are described in connection with the embodiments of FIG. 8 and FIG. 9.

Figure 10:
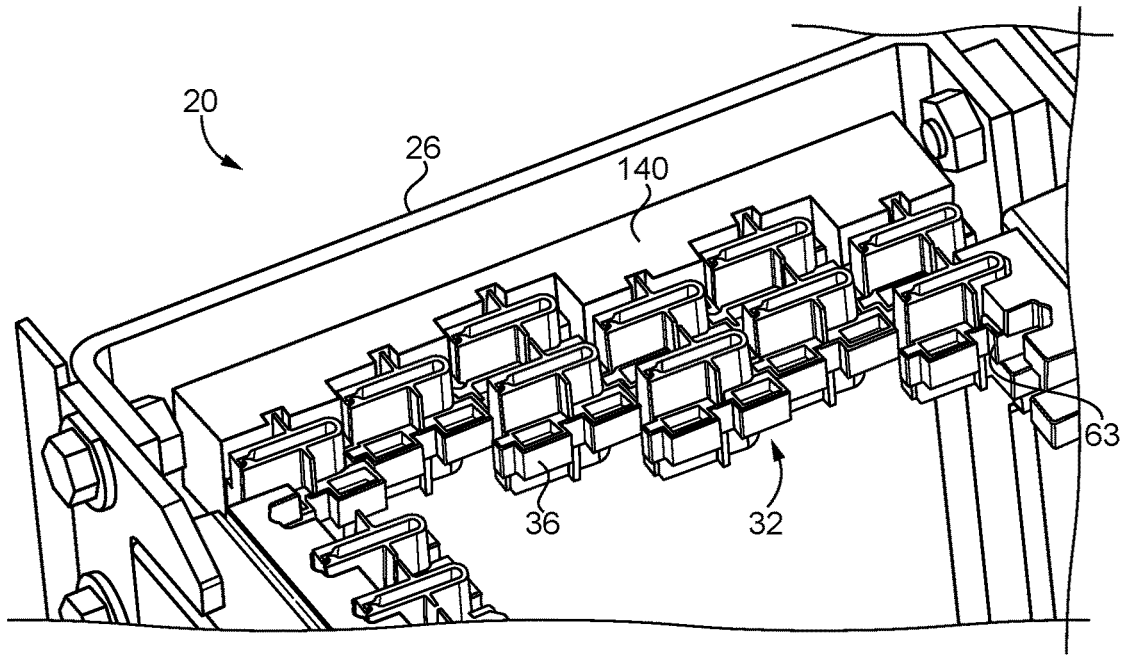
FIG. 10 is a diagrammatic view of a portion of a radiator, according to one embodiment.
Figure 11:
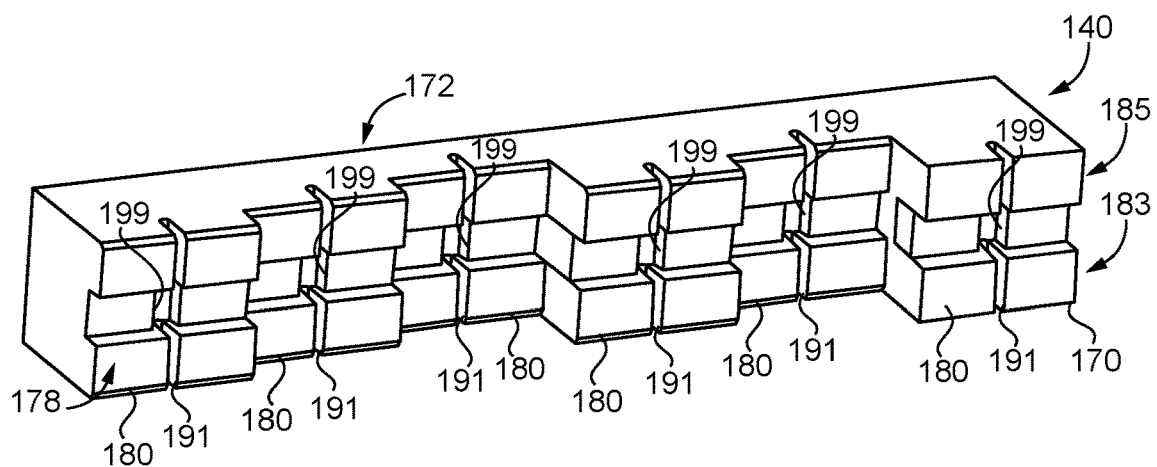
FIG. 11 is an isometric view of a lateral bump stop for a radiator, according to yet another embodiment.
Figure 12:
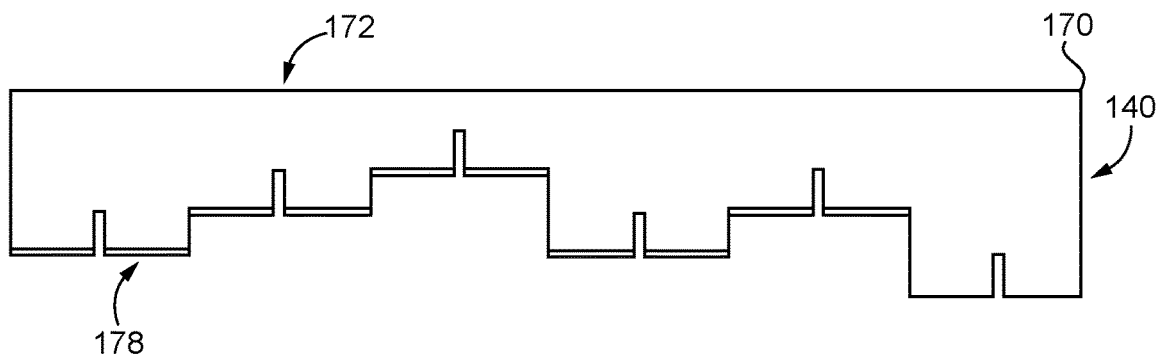
FIG. 12 is a top view of the lateral bump stop of FIG. 1.

Turning now to FIGS. 10-12, there is shown radiator 20 and additional details of second lateral bump stop 140. In FIG. 10, second lateral bump stop 140 is shown fitted between the array of tube assemblies 32, and in contact with a plurality of tube clips 36. It can be noted that tube clips 36 are interlocked with one another, and arranged in a staggered packing pattern that is complementary to a staggered cushion pattern hereinafter described with regard to lateral bump stop 140. In FIG. 10, coolant tubes are not shown to better illustrate the general arrangement of components. It will be appreciated that tube clips 36 as shown in FIG. 10 are arranged in a staggered packing pattern, and associated coolant tubes 34 are fitted through tube clips 36 such that peripheral tube assemblies also have the staggered packing pattern.

Referring also to FIGS. 11 and 12, lateral bump stop 140 includes an elongate body 170 having a back side 172, and a front side 178 formed by a plurality of cushions 180 arranged in a first horizontal row 183 and a second horizontal row 185. Cushions 180 are arranged in a staggered cushion pattern different from the staggered cushion pattern of lateral bump stop 40. In other instances, the staggered packing pattern of peripheral tube assemblies 39 might be the same in association with each of lateral bump stop 140 and lateral bump stop 40. Moreover, it will be understood that lateral bump stops according to the present disclosure can be designed to fit with any of a great variety of staggered packing patterns. Elongate body 170 further has a plurality of slots formed therein extending vertically through cushions 180. Slots 191 may extend through cushions 180, and similar longitudinally aligned slots (not numbered) could extend through cushions in second horizontal row of cushions 185. Slots 191 can further be understood to be a set of narrower slots, and elongate body 170 further has a set of wider slots 199 formed therein. Wider slots 199 are in longitudinal alignment, but set back toward back side 172, relative to narrower slots 191. Wider slots 199 are also understood to be set back from the corresponding one of the plurality of cushions 180. Based on the shape of tube clips 36, which can include a projecting portion of skirt block 60 on one side, but not projecting or to a lesser extent on the other side, slots 199 can be shaped and structured to receive the projecting portion of skirt block 62. It can be noted also from FIG. 10 that a projecting skirt block of one of tube clips 36 would be received within a complementary recess 63 in an adjacent one of tube clips 36. Lateral bump stop 140 has a geometry that is thus structurally consistent with the packing arrangement of tube clips 36 and tube assemblies 32 and the geometry of tube clips 36 themselves, as is the case with lateral bump stop 40 and other lateral bump stops contemplated herein. FIG. 12 illustrates a top view of elongate body 170, from which it can be noted the variable-step profile and overall stepped off arrangement of cushions 180 and the associated cushion faces (not numbered).

Figure 13:
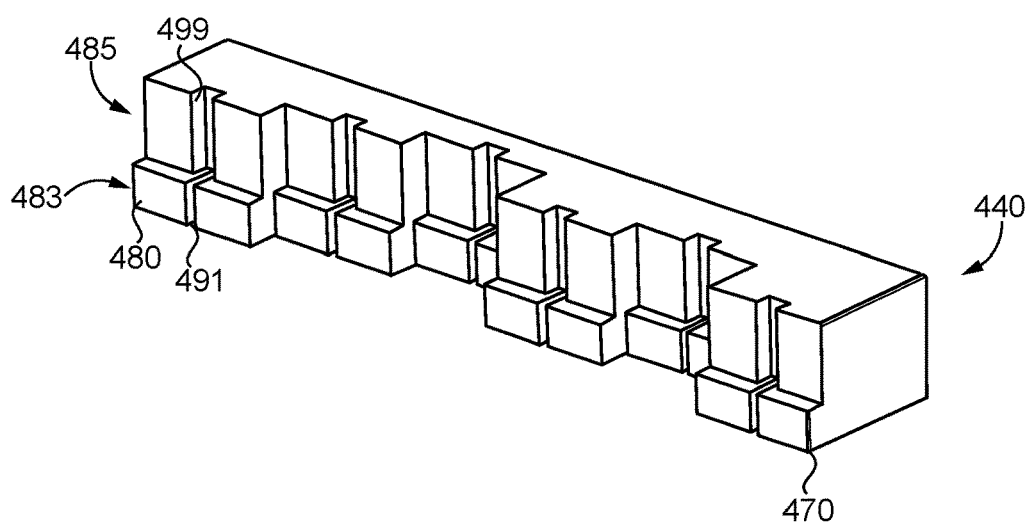
FIG. 13 is an isometric view of a lateral bump stop for a radiator, according to yet another embodiment.

Referring to FIG. 13, there is shown a lateral bump stop 440 according to yet another embodiment and including an elongate body 470 with cushions 480 in a first horizontal row 483 and a second horizontal row 485. Narrower slots 491 generally analogous to those described in connection with FIG. 11 extend vertically through cushions 480, with wider slots 499 extending through cushions in second horizontal row 485. Lateral bump stop 440 may find application where it is desirable to fit lateral bump stop 440 into a service position in relatively tight quarters. It will be appreciated that skirt blocks in tube clips may be slid vertically into place through wider slots, with tabs being slipped into position through narrower slots 491.

INDUSTRIAL APPLICABILITY

Referring to the drawings generally, it will be appreciated that lateral bump stops according to the present disclosure can be added to a population of machines in the field. Certain radiators are manufactured with hardware for supporting and mitigating shocks, vibrations, et cetera, at a front side and a back side of an array of tube assemblies, with some space extending between side peripheral tube assemblies and a radiator frame, but no lateral support targeted at mitigating lateral loads. The present disclosure contemplates installing lateral bump stops into space within existing radiators for mid-support, with minimal or zero need for modification to the radiator itself. In a typical application, radiators may be removed from a machine for servicing, such as replacement of parts, testing, or other purposes such as remanufacturing. Those skilled in the art will appreciate that disassembling the many different pieces and parts of a radiator can be relatively labor intensive, and therefore providing a lateral bump stop as a component requiring minimal preparation or modification for installation can be desirable. In some instances, a service package for installing a lateral hump stop on a radiator according to the present disclosure could include a single lateral hump stop, each of a left lateral bump stop and a right lateral bump stop, or potentially one or more lateral bump stops with additional mounting hardware. In other instances lateral bump stops according to the present disclosure can be installed as part of newly manufactured radiators.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A radiator comprising:
a radiator frame including a first frame side, a second frame side, a first frame end, and a second frame end;
an array of tube assemblies each including a coolant tube and a tube clip coupled with the coolant tube at a mid-support location, the array of tube assemblies being supported in the radiator frame in parallel vertical orientations between the first frame end and the second frame end and including inner tube assemblies, and peripheral tube assemblies arranged in a staggered packing pattern adjacent to the first frame side; and
a lateral bump stop fitted between the array of tube assemblies and the first frame side, the lateral bump stop including a plurality of cushions arranged in a staggered cushion pattern complementary to the staggered packing pattern and each in contact with the tube clip of one of the peripheral tube assemblies,
wherein the plurality of cushions includes a first horizontal row of cushions and a second horizontal row of cushions each arranged in the staggered cushion pattern.

2. The radiator of claim 1 wherein the lateral bump stop has a plurality of slots formed therein that extend vertically through the plurality of cushions.

3. The radiator of claim 1 wherein the lateral bump stop includes an elongate one-piece body having the plurality of cushions formed integrally therein.

4. The radiator of claim 3 wherein the lateral bump stop includes a planar back face, and the plurality of cushions each include a front cushion face located opposite to the planar back face.

5. The radiator of claim 4 wherein the lateral bump stop further includes a plurality of mounting elements formed integrally in the elongate one-piece body and projecting from the planar back face.

6. The radiator of claim 4 further comprising an upper mounting plate and a lower mounting plate each supported adjacent to the first frame side, and the lateral bump stop is trapped between the upper mounting plate and the lower mounting plate.

7. The radiator of claim 1 wherein the lateral bump stop is a first lateral bump stop, the radiator further comprising:
a forward stop bar extending horizontally across a forward side of the array of tube assemblies;
a back stop bar extending horizontally across a back side of the array of tube assemblies; and
a second lateral bump stop fitted between the array of tube assemblies and the second frame side of the radiator frame and in contact with a plurality of tube clips in the array of tube assemblies.

8. The radiator of claim 7 wherein the second lateral bump stop includes a plurality of cushions arranged in a second staggered cushion pattern different from the staggered cushion pattern of the first lateral bump stop.

9. A lateral bump stop for supporting an array of tube assemblies in a radiator, the lateral bump stop comprising:
an elongate body including a back side having a planar back face, and a front side formed by a plurality of cushions distributed along a length of the elongate body from a first body end to a second body end;
the plurality of cushions being arranged in a staggered cushion pattern, and each cushion of the plurality of cushions including a front cushion face oriented parallel to the planar back face, and a horizontal support face oriented normal to the front cushion face; and
the front cushion faces being stepped off from one another by a plurality of different step distances that are based on the staggered cushion pattern, such that the front side of the elongate body forms a variable-step profile structured to complement a staggered packing pattern of the array of tube assemblies in the radiator,
wherein a lateral thickness of the elongate body extends between the planar back face and the plurality of cushion faces, and wherein the lateral thickness is stepped down, in net, from the first body end to the second body end.

10. The lateral bump stop of claim 9 wherein the elongate body is a molded one-piece body.

11. The lateral bump stop of claim 10 wherein the elongate body has a plurality of slots formed therein, each slot of the plurality of slots extending through one cushion of the plurality of cushions.

12. The lateral bump stop of claim 11 wherein:
the plurality of cushions includes a first horizontal row of cushions and a second horizontal row of cushions each arranged in the staggered cushion pattern; and
the plurality of slots includes a first set of slots extending vertically through the first horizontal row of cushions and a second set of slots extending vertically through the second horizontal row of cushions and in longitudinal alignment with the first set of slots.

13. The lateral bump stop of claim 11 wherein the plurality of slots includes a set of narrower slots, and wherein the elongate body further has a set of wider slots formed therein, the set of wider slots being in longitudinal alignment with the set of narrower slots and set back from a corresponding one cushion of the plurality of cushions.

14. The lateral bump stop of claim 9 further comprising a plurality of mounting elements arranged within a perimeter of the planar back face and projecting from the planar back face.

15. The lateral bump stop of claim 14 wherein the plurality of mounting elements is formed integrally with the elongate body.

16. The lateral bump stop of claim 9 wherein the back side includes a mounting panel formed integrally with the elongate body.

17. A shock and vibration mitigation system for a radiator, the shock and vibration system comprising:
a lateral bump stop including an elongate body having a back side with a planar back face, and a front side formed by a plurality of cushions, a depth direction extending from the planar back face toward the front side;
the plurality of cushions being arranged in a staggered cushion pattern, and each including a front cushion face oriented parallel to the planar back face;

the front cushion faces being stepped-off from one another according to the staggered cushion pattern, such that the front side of the elongate body forms a stepped profile; and a plurality of tube clips, for mid-support of coolant tubes in the radiator, each tube clip of the plurality of tube clips being in contact with one cushion of the plurality of cushions, and the plurality of tube clips being interlocked with one another and arranged in a staggered packing pattern that is complementary to the staggered cushion pattern, wherein the lateral bump stop further includes a plurality of slots formed therein, each slot of the plurality of slots extending through one cushion of the plurality of cushions and being open along the depth direction, and wherein the plurality of slots includes a set of narrower slots and a set of wider slots, the set of wider slots being in longitudinal alignment with the set of narrower slots and being set back from a corresponding one cushion of the plurality of cushions against the depth direction.

18. The shock and vibration mitigation system of claim 17 wherein each tube clip of the plurality of tube clips includes a tab positioned within a corresponding slot of the plurality of slots.

* * * * *